Inventors
M. R. MAUGE-
J. R. A. F. ESCANDE
By Robert Harding Jr
Attorney

Inventors
M. R. MAUGE-
J. R. A. F. ESCANDE
By Robert Harding Jr.
Attorney

Inventors
M. R. MAUGE-
J. RA.F. ESCANDE
By Robert Harding Jr.
Attorney

United States Patent Office 2,787,667

Patented Apr. 2, 1957

2,787,667

APARTMENT SATELLITE CIRCUITS

Marcel Roger Mauge and Jean Raymond Antoine Font Escande, Boulogne-Billancourt, France, assignors to International Standard Electric Corporation, New York, N. Y., a corporation of Delaware Application October 4, 1955, Serial No. 538,492

5 Claims. (Cl. 179—27)

This invention relates to automatic telephone circuits for apartment satellites. Apartment satellite circuits are known which operate without local battery but with local ground, which are connected to the exchange by two-wire lines and are fed and controlled by the exchange by means of these lines in order to connect the satellite stations selectively to one of these lines for the calls, while ensuring a common linking when at rest, thus enabling any station to engage a call; they comprise a line circuit in the exchange inserted between the call finders and the final selectors, enabling the selecting means of the satellite to be controlled in order to connect the one among the stations which is either calling or called to the line.

In the satellite, a cam switch has been used as a selecting means. These switches, are well fitted for this purpose for they comprise break contacts as well as make contacts in each position and they have low current consumption.

In this kind of circuit, the satellite is connected to the exchange by several two-way lines with a line circuit for each of them inserted between special call-finders, enabling the selection of the calling station to be controlled in the satellite, and special selectors, enabling the selection of the station designated by the unit of the requested number to be controlled in the satellite. The satellite circuit is equipped with a double locking and unlocking relay operating at the end of the selection. Stations are equipped with a ground button in order to call the exchange, and with meters set in the satellite.

The present addition relates to circuits of the above-cited kind, also using cam switches but offering different features and new advantages. It relates in particular to the kind of circuits in which the satellite is connected to the exchange by two one-way lines, with a single line circuit for both of them inserted in the exchange between normal call-finders and normal final selectors, selecting means being provided in this line circuit to connect the meter assigned to the calling subscriber to the call-finders and busy this subscriber's position on the final selectors and also to be connected to the called subscriber's position on the final selectors. This position may be any position and the satellite stations may be thus designated by any numbers.

A further object of the invention is to provide a satellite which is equipped with ordinary means, such as ordinary stations with no ground button, and ordinary relays, which do not lock. Still another object of the invention is to provide a satellite circuit by means of which it is possible to cut off any station subject to a false call (with its own line). This possibility is particularly important for the rural satellites, which are subject to false falls, for instance through failures of their own lines, and also are difficult to repair because of their remoteness.

According to a feature of the invention, the satellite circuit comprises two cam switches for connecting the stations selectively to the two incoming and outgoing lines, with a connecting relay associated with each switch, and a ringing relay associated with the incoming line switch as well. Break contacts of these switches with the switches in their normal position are used to control the operation of the line circuit through one wire, the corresponding switch of the satellite being controlled in each station position by means of another wire in agreement with its own selecting means to ensure the linking of all the stations with the exchange before their selection.

According to a further feature of the invention, the selecting means of the line circuit are also constituted by two cam switches for the selective connection of this circuit either to the meters and the busying wires on the final selectors or to the junctions coming from the final selectors.

According to a further feature of the invention, all the positions of the stations on the final selectors are busied during the operation of the selecting means provided for the calls from the satellite, so that a calling final selector may not first find a free line circuit, and then find the requested station busied as having itself caused a call. The operation of said selecting means is prevented as soon as the line circuit is engaged by the final selector, till the other selecting means, provided for the calls from the exchange, connect the called station in the satellite.

According to a further feature of the invention, a calling station in the satellite can be tested and connected by the selecting means provided for these calls in the course of the movement of these means from their rest position caused by a call, as well as in the course of the reverting of these means to their normal position after a call.

According to a further feature of the invention, the satellite circuit comprises, a false call relay for each station which can be operated from the exchange when this station is connected to the outgoing line and which is blocked on the station loop in order to be de-energized at the end of the false call, the blocking circuit being fed by an auxiliary local source of small capacity.

According to a further feature of the invention, the false-call relay of a station is operated after each call of this station when there is a call coming from the exchange through a relay added to the incoming part of the satellite circuit and fed by the local source, so as to place in "false call" a station which does not hang up after the call requested by the exchange.

Further features and advantages of the present invention will be disclosed in the description of two embodiments, said description being made hereinafter in connection with the accompanying drawings, in which.

Figure 1:
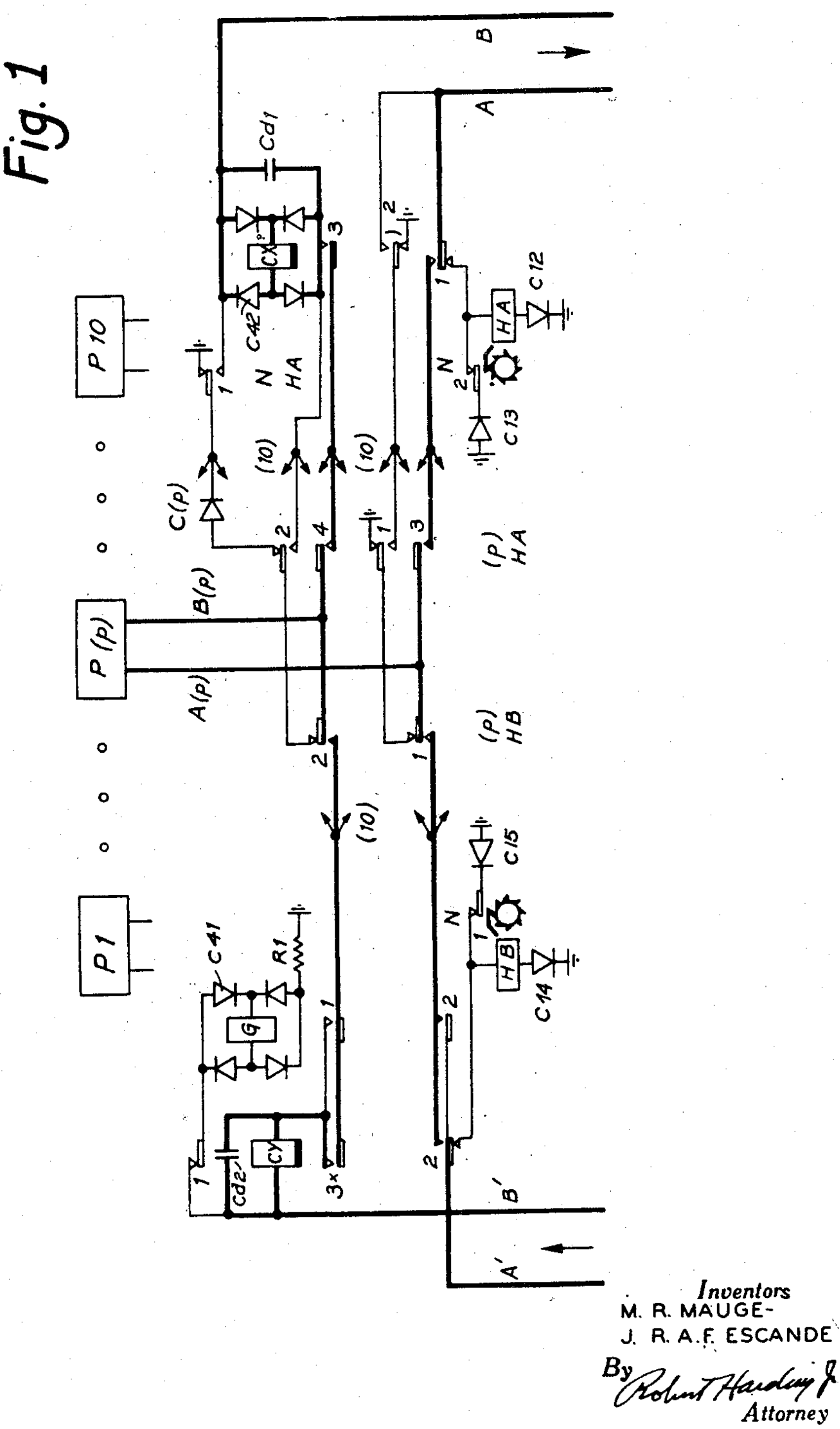
Fig. 1 is the diagram of a satellite circuit of one embodiment of the invention.

Referring to Fig. 1, the represented satellite circuit comprises 10 stations P1 to P10, which two cam switches, HA and HB, can selectively connect, the first to the outgoing line A—B, and the second to the incoming line A'—B'. The connection of the selected station is effected on the outgoing side by a common relay CX, and on the incoming side, by two common relays G and CY.

Figures 2, 4:
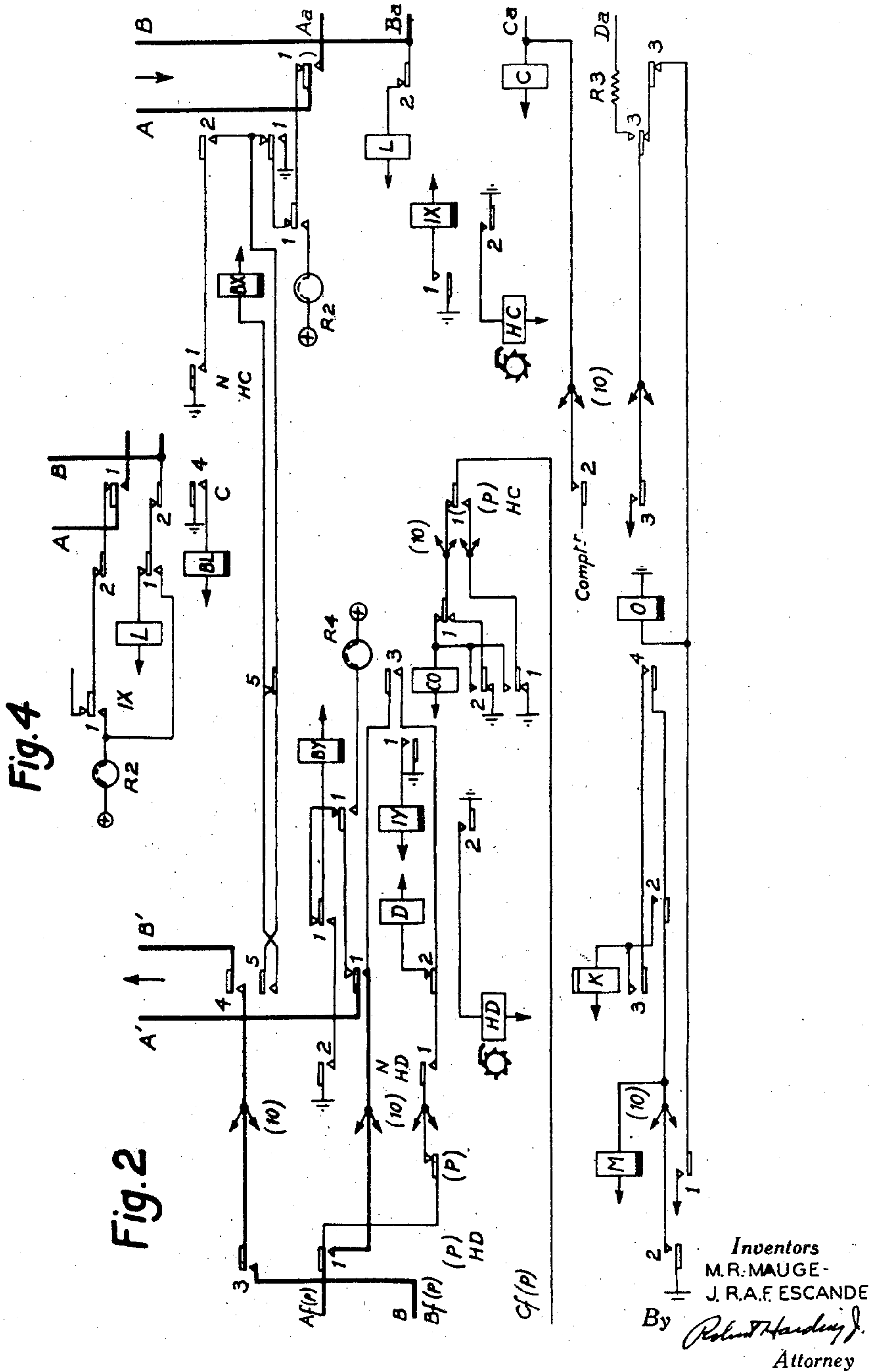
Fig. 2 is the diagram of the corresponding line circuit.
Fig. 4 is the diagram of a corresponding modification of the line circuit.

The corresponding line circuit, represented in Fig. 2 is inserted at the right of the figures between the line A—B coming from the satellite and the four-wire line *Aa*—*Ba*—*Ca*—*Da*, multipled on the call-finders of the normal chain, and at the left of the figures between the line A'—B' going to the satellite and the three-wire lines *Af*—*Bf*—*Cf* carried by the final selectors. This circuit comprises a relay CO which is connected to all the wires Cf when the circuit is at rest and which is controlled by both parts of the circuit, a cam switch HC enabling a ground to be selectively connected over contacts of relay CO for the calls coming from the satellite to the wire Cf(p) corresponding to the calling station P(p) in order to busy its position on the final selectors, and also to connect the same subscriber's meter to wire Ca, two beating relays IX and BX, a line-testing relay L, connected to wire B when it is at rest, and a connecting relay C, connected to wire Ca; a cam switch HD enabling the line A'B' to be connected selectively, for the calls to the satellite, to the corresponding wires Af(p)—Bf(p), two beating relays IY, BY, two engaging relays, M and O, and two selection-ending relays, D and K.

Except for the combined operation of relay CO, the operation of the two parts of the circuit is independent so that the connection of a satellite station for one kind of call (incoming or outgoing) does not prevent the connection of another station for the other kind of call.

A brief description of the operation in case of a call coming from the satellite will first be given and then a detailed description of the circuits involved. When switch HA is at rest, a ground is applied in the satellite on wire A(p) of each station, and wires B(p) of all the stations are connected to the wire of the outgoing line B. The taking-off of the handset at the station connects this ground to wire B. Relay L operates in the line circuit and it starts the switches by means of the beating relays BX and IX in a manner to be described later. When the calling station is reached by switch HA, relay L operates again, stops the operation of the switch and calls the calling chain. Connecting relay CX operates in the satellite. The chain sets a ground on wire Ca, which operates relay C, this relay switches the line A—B over the line Aa—Ba. The corresponding wire Cf is busied, and the metering will be effected on the meter assigned to the calling station.

In case of a call for the satellite, the final selector connects a ground on the corresponding wire Cf(p). This ground spreads over all the wires Cf in order to busy all the satellite subscribers' positions on the final selectors. The final selector connects a ground on wire Af(p), which operates relay D, this relay starts switches HB and HD by means of the beating relays BY and IY in a manner to be described later. When switch HD connects the line circuit to the calling line, the same ground Af(p) operates again relay D. Relay K connects the outgoing line A'—B' to the calling line Af(p)—Bf(p), and relay G of the satellite circuit connects the called station to the line A'—B'. Relay D stops the motion of switches HB and HD. Switch HB has reached the called station, which receives the ringing current. When the called party lifts the receiver, connecting relay CY operates in the satellite in a manner to be described as it de-energizes relay G.

The detailed operation of these circuits will now be described. When the circuits are at rest, relay BX is connected to wire A: . . . Wire A, r(rest–C.1, r–IX.1, r–L.1, r–CO.5 or t(make)–K.5, BX battery. Relay L is connected to wire B: . . . wire B, r–c.2, L, battery. Relay C is connected to wire Ca: . . . wire Ca, C battery. Relay BY is connected to wire A': . . . wire A', r–K.1, r–IY.1, r–D.1, BY, battery. Relay D is connected to all the wires Af(p): . . . one wire Af(p), a corresponding contact r–M.(p). contact t–NHD.1 (make in normal position), multipled on the previous ones, r–K.2, D, battery. Relay CO is connected to all the wires Cf(p), a corresponding contact r(p)–HC.1 (which makes in the position p of switch HC), contact r–O.1, multipled on the previous ones, CO, battery. In the satellite, swich HA is connected to wire A: . . . wire A, r–CX.1, HA, rectifier cell C12, ground. A ground is connected to the wire A of each station: ground, r(p)–HA.1, r(p)–HB.1, wire A(p). The wire B of all the stations is connected to wire B: wire B(p), r(p)–HB.2, r(p)–HA.2, individual cell C(p), contact tN–HA.1 multipled on the cells C(p), wire B. Switch HB is connected to wire A': . . . wire A', r–CY.2, HB, cell C14, ground. Relay G is finally connected to wire B': . . . wire B', r–CY.1, rectifier bridge C14 with relay G, resistance R1, ground.

The case of a call coming from the satellite will first be described. When the calling has its receiver lifted, it connects its ground wire A(p) to wire B. In the line circuit, relay L operates on this ground wire B in order to start switches HA and HC. Relay BX operates: ground, tN–HC.1, t–L.2, r–CO.5, BX, battery, and it operates relay IX: ground, t–BX.1, IX, battery. Electromagnet HC is excited: ground, t–IX.2, HC, battery, and its contact N–HC.1 opens, thus breaking the circuit of BX which slowly releases. Relay IX, operating, applies a positive battery on wire A: +, resistance R2, t–IX.1, r–C.1, wire A . . ., and in the satellite circuit, electromagnet HA is excited by this battery + on wire A. Through ground, tN–HA.1 . . ., all the wires B(p) are grounded instead of being connected to wire B. This ground, with the one which remains connected to wires A(p) through r(p)–HA.1, makes the stations insensitive.

When BX is de-energized, it cuts off relay IX at BX.1 and relay IX is slowly released. When IX is released, it cuts off electromagnets HA and HC at IX.1 and IX.2, and the switches move to position 1 to make their contacts (not shown) belonging to this position.

At N–HA.1, the satellite has cut off wire B, and relay L has been de-energized in the line circuit and it will only operate again on the testing circuit, as will be seen. A ground has been connected to wire A: ground, cell C13, rN–8A.2, r–CX.1, wire A. Relay BX operates now on this ground wire A.

As previously, BX operates IX, which cuts off the energizing circuit for BX and excited HA and HC, which move to break their first position contacts. BX is deenergized, followed by IX, which re-establishes the excitation of relay BX and cuts off that of electromagnets HA and HC, which move to position 2, in which contacts make for the second position. The selecting motion thus goes on until switches HA and HC are brought to their position (p), in which their contacts (p)–HA and (p)–HC make.

Relay L then operates on the testing circuit of the calling station P(p): ground, r–CX.2, t(p)–HA.1 r(p)–HB.1, loop A(p)–P(p)–B(p), r(p)–HB.2, t(p)–HA.2, rectifier bridge C42 with relay CX, wire B . . . wire B, r–C.2, L, battery. At L.1, relay L cuts off BX (which has no time to operate, or at least, to operate IX) and it thus stops the switches. At L.3 it cuts off relay O, whose operation is described hereinafter with that of relay CO.

Relay CX operates on bridge C42 and it is held on a ground which relay L applies to wire A to replace the local ground that relay CX cuts off at CX.2: ground, t–L.1, r–IX.1, r–C.1, wire A . . . wire A, t–CX.2 and so on. At the same time, relay CX connects station P(p) independently of the break contacts of HB: wire A, t–CX.1, t(p)–HA.3, loop A(p)–P(p)–B(p), t(p)–HA.4, t–CX.3, rectifier bridge with relay CX, wire B. . . .

A starting potential is set on the chain of the call-finders: battery, T(p)–HC.3, t–L.3, resistance R3, wire Da. When the chain seizes the call, it applies a ground to wire Ca, which operates relay C. At t–C.1, relay C switches wire A over to wire Aa. Relay L, cut off at C.2, is de-energized and it cuts off the calling potential at L.3. The feed of the satellite is effected again by the normal switching chain. Relay O remains cut off at C.3.

The call takes place with the circuits in this condition. The metering is effected on the meter assigned to the calling station by contact 2 of the switch HC in position (p): metering potential . . . wire Ca, t(p)–HC.2, meter (not represented).

After the call, the hanging up of the receiver at the calling station cuts off the loop of this station, and the chain de-energizes relay C as it is released. The circuits are then in the same state in which they were before reaching the calling station: relay BX operates on wire A, and the switches start their motion again till they are brought back again to their normal position, in which the satellite cuts the ground off at N–HA.2 which was exciting BX.

We shall now describe the operation of relays CO and O which busy wires *Cf* and prevent the switches on both sides from operating at the same time in order to avoid failure which could otherwise occur in certain cases. In certain modes of utilization, it is enough to busy the wire *Cf*(*p*) when the incoming side of the line circuit reaches this station when station P(*p*) has called; such a busying of the corresponding wire can be effected for instance by means of a contact *t*(*p*)–HC (not represented). However, in other modes of utilization, as regards particularly the trunk calls, it is necessary that a final selector which has found its position free on the called subscriber, should find it actually free when the switches reach this station in the satellite. It is then necessary to busy the position of a subscriber on the final selectors as soon as he is calling and able to engage the chain through his call; and when the corresponding switches start, it is necessary to busy the wire *Cf* of all the stations during the motion of these switches because the calling station is not determined until it is reached by these switches. Besides, as a calling station can also be reached while the switches are reverting to their normal position after a call, the busying of all the wires *Cf* must also be effected during the reverting motion of the switches. The circuit in accordance with the invention ensures the busying of all the wires *Cf* during any motion of the switch HC, and it restricts the busying to the wire *Cf*(*p*) when this switch is stopped on the station P(*p*), thus releasing the other wires *Cf*.

On the other hand, when the call comes from the exchange, with the grounding of wire *Cf*(*p*) belonging to the called station it is also necessary to busy all the other wires *Cf* from the engagement of this wire *Cf*(*p*) to the end of the call, since only one selector at a time can reach a station in the satellite through the line A′—B′. Moreover, in order to ensure that the selector shall find the called station actually free, it is necessary to prevent this station from being engaged meanwhile by a call coming from it. To accomplish this purpose the invention provides that the seizing of the line circuit by a final selector will prevent the motion of the switches on the other side till the switches on the side of the calls coming from the exchange reach the called station that the final selector had found free.

It will be first assumed that the line circuit has been engaged by a call coming from the satellite when it was at rest, as described above. As soon as switch HC operates the contacts in position 1, and in all the other positions, the wire *Cf*(*p*) of the position of the switch is busied through: ground, *r*–CO.1, *t*(*p*)–HC.1, wire *Cf*(*p*). The wire *Cf*(*p*) of the position (*p*) on the calling station, on which the switches stop for the call, is also busied by a similar circuit. The wires *Cf* of all the positions (*p*) at which switch HC is not located and whose contacts are at break, are grounded through: ground, *r*–CO.2, *t*–O.1, *r*(*p*)–HC.1, wire *Cf*(*p*). These other wires *Cf* are therefore busied only when relay O is operating. Relay O is operating when switch HC is in motion, as it is excited in each position by: ground, O, *r*–C.3, *r*–L.3, *t*(*p*)–HC.3, battery. When the switch stops on the calling station, relay L operates, then relay C operates too, as seen above, and relay O is de-energized, as it is cut off at L.3 and C.3 and it releases the other wires *Cf*.

After the call, relay C is de-energized, L remaining at rest, and the switches are set in motion again. Relay O operates again on the same circuit, and all the wires *Cf* are busied again till the switches revert to normal position. If another call coming from the satellite is engaged meanwhile, relay O is de-energized, and only the wire *Cf*(*p*) of the new engaged station remains busied during the call.

It follows that all the stations are busied on the final selectors during the motion of the switches, and during the call engaged by another station, only this station is busied on the final selectors.

It will now be assumed that the line circuit is engaged by a final selector, which busies the wire *Cf*(*p*) of the station that it requests. Relay CO operates: busying ground . . . wire *Cf*(*p*), *r*(*p*)–HC.1, *r*–O.1, CO, battery. Thanks to the multiplying on all the contacts *r*(*i*)–HC.1, this ground spreads over all the other wires *Cf*(*i*) and it busies the line circuit on all the selectors. Relay O operates (as will be seen hereinafter) as soon as switch HD sets in motion. Relay CO is then held through: ground . . . wire *Cf*(*p*), *r*(*p*)–HC.1, T–O.1, *t*–CO.2, CO, battery. The ground remains connected on the other wires *Cf* as previously. At the same time, relay CO cuts off the circuit of relay BX in CO.5 and it thus prevents the motion of switches HA and HC, even if there is a call coming from the satellite.

When switches HB and HD reach the requested subscriber, relay K operates (as will be seen hereinafter) and it reestablishes the circuit of relay BX at *t*–K.5. From that time, switches HA and HC can operate to serve a call coming from another station of the satellite, or to revert to normal position. After the call, the final selector releases the wire *Cf*(*p*) as well as all the other wires *Cf*.

It is to be understood that this combination of relays O and CO also ensures a correct operation when the line circuit is engaged by a final selector at the same time it is also engaged for a call called by the satellite: and when it is called from the satellite while it is engaged by a final selector.

The case of a call coming from the exchange will now be described. The incoming part of the line circuit (switch HC) is stopped, either in normal position or during a call; otherwise, as has been seen, all the wires *Cf* would be busied. The final selector applies a ground to the wire *Cf*(*p*) of the station *P*(*p*) which it calls. As has just been seen, this ground operates relay CO and it spreads over all the other wires *Cf*, and relay CO prevents the motion of the incoming part. The ground wire A of the ringing circuit operates relay D through a circuit common to all the wires *Af*: ground . . . wire *Af*(*p*), *r*–M.(*p*), *t*N–HD.1, *r*–K.2, D, battery.

Relay D excites relay BY in order to start switches HB and HD: ground, *t*N–HD.2, *t*–D.1, BY, battery. Relay BY operates relay IY: ground, *t*–BY.1, IY, battery Relay IY excites electromagnet HD: ground, *t*–IY.2, HD, battery, and it applies to wire A′ a positive battery which excites electromagnet HB: +, resistance R4, *t*–IY.1, *r*–K.1, wire A′ . . . wire A′, *r*–CY.2, HB, rectifier cell C14, ground. The contacts NHB1 are closed while the contacts NHD1 and NHD2 are opened. Relay D is cut off at N–HD.1 and it is de-energized. Relay BY is cut off at N–HD.2 and it is slowly de-energized. IY is slowly de-energized after BY, as it is cut off at BY.1.

As relay IY is de-energized, the excitation of the two electromagnets, HB and HD, is cut off, and the two switches act to close their bunches of contacts corresponding to position 1. Relay M is operated: ground, *t*1.HD.2 (not represented, similar to contact *t*(*p*)–HD.2 which is represented), M, battery. Relay O operates: ground, O, *t*–M.11, battery. Relay M separates the wires *Af* at M.(*p*) and at the similar contacts M.(*q*) (not represented). Relay O switches relay CO in the manner described above.

Relay BY is excited again by a ground coming now from the satellite: ground, rectifier cell C15, *r*N–HB.1, *r*–CY.2, wire A′ . . . wire A′, *r*–K.1, *r*–IY.1, *r*–D.1, BY, battery. Relay IY operates again, and the motion of the switches thus goes on till switch HD reaches the calling line (*p*) coming from the final selector. Relay M, which is slow to be de-energized, is held during the periods of excitation of electromagnet HD, when contact (q)-HD.2 (not shown) has reverted to its break condition, whereas contact (q+1)-HD.2 has not yet been operated to its make condition.

When the calling position is reached, relay D operates again, this time on a circuit particular to this position: ground . . . wire Af(p),t(p)-HD.1, t-CO.3, r-K.2, D, battery. At D.1, it cuts off relay BY; this stops the switches in position (p). Relay K operates slowly: ground, t(p)-HD.2, t-D.2, K, battery. It is locked independently of D: same ground, t(p)-HD.2, t-CO.4, t-K.3, K, battery. It then cuts off relay D at K.2.

Relay K connects the line A'—B' to the final selector: wire Af(p), t(p)-HD.1, t-K.1, wire A'; wire Bf(p), t(p)-HD.3, t-K.4, wire B'. The ringing current that the selector sends on wire Bf(p) operates relay G in the satellite: ringing current . . . wire B', r-CY.1, rectifier bridge C41 with relay G, resistance R1, ground. Relay G operates and extends the wires A'—B'. The ringing current passes through the called station: ringing current . . . wire B', condenser Cd2, t-G.1, t(p)-HB.2, wire B(p), bell of station P(p), wire A(p), t(p)-HB.1, t-G.2, wire A' . . . ground on wire A in the selector.

When the subscriber removes his receiver, the direct current operates relay CY which substitutes its contacts t-CY.3 and t-CY.2 for contacts t-G.1 and t-G.2 in the previous circuit. At CY.1, it cuts off bridge C41, and relay G is de-energized. The call takes place with the circuit in this condition.

After the call, the chain is released under the required conditions, particularly by hanging up of the calling station. The final selector suppresses the feed of the line, this de-energizes relay CY if the hanging up of station P(p) has not already de-energized it first. The selector suppresses the ground wire C also, this deenergizes relay CO. Relay K is de-energized, cut off in CO.4. Relays M and O are held.

The line circuit remains busied as regards the final selectors by a ground (r-CO.2 or r-CO.1) applied to all the wires Cf under the above-mentioned conditions, either by the break or make condition of contacts HC.1.

Relay BY is excited in the satellite under the same conditions as those during the called station-selecting motion described above, only that the opening of contact CO.3 does not again permit the operation of relay D. The switches therefore start their motion again till stopping in normal position on account of the cut-off of the ground in N-HB.1. Relay M is de-energized, as it is not fed any longer by the successive contacts HD.2. Relay O is cut off at M.11 and it is de-energized except if it is fed by the incoming part of the line circuit in motion. The ground wires Cf are suppressed under the same reservation.

We shall now describe the modifications that may be made with respect to the previous circuits in order to adapt them to the working conditions of the rural satellites. In these satellites, the particular lines, such as the line A(p)—B(p) of Fig. 1 may be overhead lines subject to accidents, while the remoteness of these stations does not permit the quick repair of the circuits after such accidents and the correction of false-calls caused chiefly by those accidents. It is therefore desirable to provide a device enabling a particular line to be cut off, subject to a false-call, even at the expense of a slightly supplementary equipment.

Figure 3:
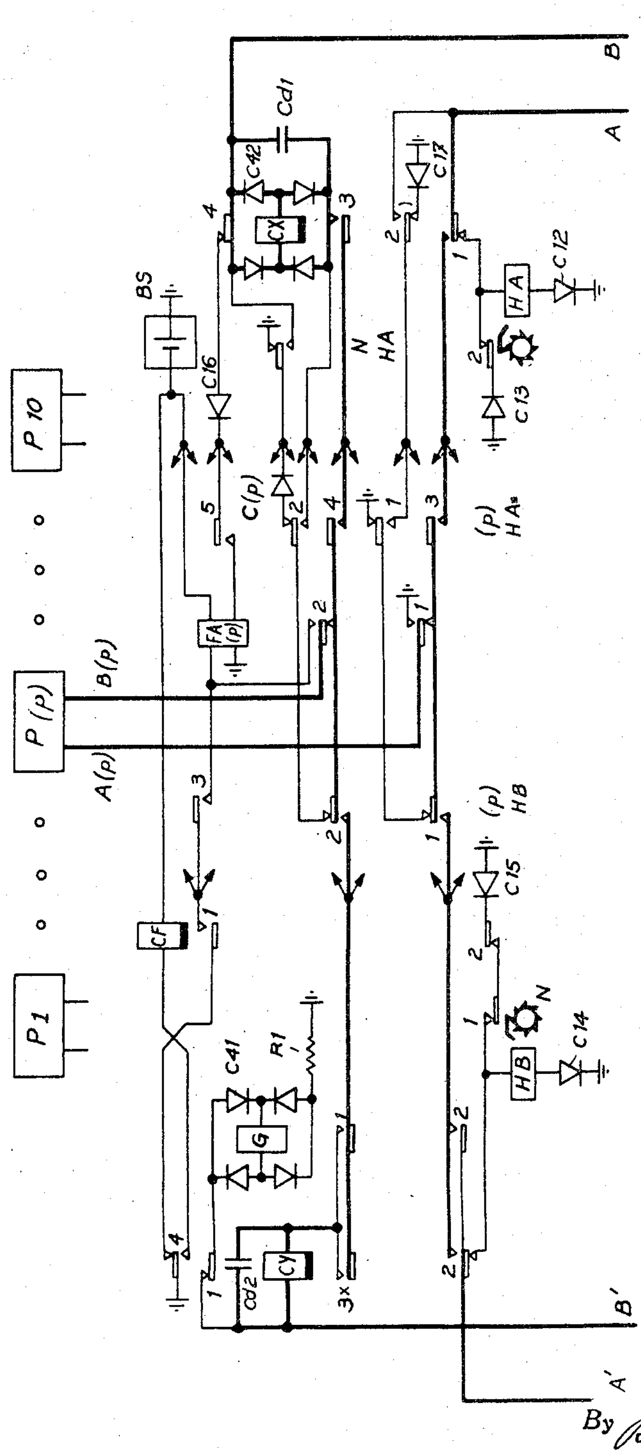
Fig. 3 is the diagram of a satellite circuit of another embodiment of the invention showing a modified form of the outgoing part or the incoming part, or both.

The modifications represented in Figs. 3 and 4 comprise such devices. One of the modifications relates to the outgoing part of the satellite circuit and the incoming part of the line circuit: it enables a station subject to a false-call to be cut off by means of relays FA(p) added to the satellite (one for each station) and fed by an auxiliary source of small capacity, BS, such as a dry cell or a small rectifier; and by means of a relay BL added to the line circuit. A modification which may be added to the previous one relates to the incoming part of the satellite: it enables a station which has not hung up to be cut off, and it thus makes the satellite available for the other subscribers without waiting till the exchange circuits intervene to treat it as a station subject to a false-call. This supplementary modification adds a relay CF to the satellite and requires a slightly larger source BS.

Fig. 3 shows a satellite circuit comprising the two modifications, and Fig. 4 shows the corresponding modification of the line circuit of Fig. 2. According to the first modification, the connection of wires A(p), B(p) of each station to the corresponding contacts (p)-HA.3, HB.1, HA.4 and HB.2 is controlled by its relay FA(p) at r-FA(p).1, r-FA(p).2. In the line circuit, relay BL, instead of relay L connects the positive battery to wire B at t-BL.1, in order to operate relay FA(p) in the satellite.

Relay BL operates whenever the chain seizes a call and operates relay C: ground, t-C.4, BL, battery. When the chain releases relay C after a call, a positive battery is applied to wire B during the slow release of relay BL which has been cut off at C.4: +, resistance R2, t-BL.1, r-C.2, wire B. The corresponding relay FA(p) operates on this positive battery: . . . wire B, r-CX.4, rectifier cell C16, t(p)-HA.5 lower winding of FA(p), ground. In a normal case, the receiver at the station has been hung up to cause the end of the call, and relay FA(p) is de-energized after relay BL. In case of a false-call, the end of the call is caused by the exchange with no hanging up of the receiver at the station. In this case, relay FA(p) would be shunted by the loop P(p) and the ground in r-CX.2 (Fig. 1). A rectifier cell C17 inserted in this place prevents this failure. Relay FA(p) then operates, and it is locked on the loop of the taken-off station (or of the short-circuited line): ground, t-FA(p).1, loop of false-call, t-FA(p).2, upper winding of FA(p), source BS.

In both cases, the return to normal position of the switches HA and HC can only start after the suppression of the positive battery wire B, for the exciting circuit of the relay BX is controlled by relay BL: ground . . . wire A, r-C.1, r-BL.2 . . . BX, battery.

The operation of the second modification is as follows: when a station P(p) seizes a call and relay CY operates, as described above, relay CF is operated: ground, t-CY.4, CF, source BS. When the exchange cuts off the feed of the line after the call, relay CY is de-energized, and during the slow de-energization of relay CF, cut off at CY.4, the corresponding relay FA(p) is operated: ground, r-CY.4, t-CF.1, t(p)-HB.3 upper winding of FA(p), source BS. If station P(p) has not yet hung up, relay FA(p) is locked, as previously described, till it is de-energized when the station hangs up, or till it is held if the false-call continues.

The return to normal position of switches HB and HD can also only start after the de-energization of relay CF, which controls the exciting circuit for relay BX: ground, cell C15, r-CF.2, rN-HB.1, r-CY.2, wire A' . . . wire A' . . . BY, battery.

While a detailed description of the present invention has been given in connection with specific embodiments, it is to be clearly understood that said invention is not limited to these embodiments; on the contrary, it is liable to many variants and modifications within its scope, chiefly as regards its adaptation to normal chains operating under different conditions.

What is claimed is:

1. An apartment satellite system comprising an exchange, a satellite circuit remote from said exchange, a pluralty of satellite stations in said satellite circuit, two one-way lines connecting said exchange with said satellite circuit and forming incoming and outgoing lines for said satellite circuit, first switch means in said satellite circuit for selectively connecting a satellite station to said one-way lines, a line circuit in said exchange, terminals in said exchange representing said satellite stations, second switch means in said exchange for selectively connecting the terminals to said line circuit, means responsive to a change in condition of one of said satellite stations for causing said first and second switch means simultaneously to connect said one satellite station to the outgoing one of said one-way lines and said line circuit to a terminal representing said one satellite station, and means responsive to a change in condition of terminals representing a satellite station for causing said first and second switch means simultaneously to connect said satellite station to the incoming one of said one-way lines and said line circuit to said terminals.

2. An apartment satellite system, as defined in claim 1, in which the first and second switch means each comprises a pair of seelcting switches one of the switches of the pair of the first switch means being adapted to connect said satellite stations selectively to one of the one-way lines for outgoing calls from the satellite circuit and the other to connect said satellite stations selectively to the other of said one-way lines for incoming calls to said satellite circuit, and one of the switches of said second switch means being adapted to connect certain of the terminals selectively to the line circuit and the other switch being adapted to connect the other terminals selectively to the line circuit.

3. An apartment satellite system, as defined in claim 2, further comprising means for blocking the operation of one of the switches of a pair when the other is performing a selection operation.

4. An apartment satellite system, as defined in claim 3, further comprising a false-call relay for each satellite station, a source of potential in the satellite circuit, means responsive to an abnormal condition of a satellite station for connecting said relay across said source of potential, and means controlled by said relay for cutting the associated satellite station off from the two one-way lines without interfering with the operation of the switches in connecting the other satellite stations to said lines.

5. An apartment satellite system comprising an exchange, a satellite circuit remote from said exchange, a plurality of satellite stations in said satellite circuit, an incoming one-way line and an outgoing one-way line extending between said satellite station and said exchange, a line circuit in said exchange, a plurality of sets of terminals corresponding respectively to said satellite stations, a first pair of selector switches in said satellite circuit adapted for selectively connecting said satellite stations respectively to said one-way lines, a second pair of selector switches in said exchange adapted for selectively connecting certain terminals of said sets of terminals respectively to said line circuit, means responsive to a call originating at one of said satellite stations for causing one of said first pair of switches and a corresponding one of said second pair of switches to step successively, means responsive to the switches of said first pair reaching the calling satellite station for stopping both said switches, means responsive to an altered condition on certain of the terminals of a set of terminals representing a call for a satellite station for causing the other of said first pair of switches and the corresponding other one of said second pair of switches to step, means responsive to said other of said second pair of switches reaching a terminal having an altered condition for stopping both said first and second switches, and means responsive to the termination of a call for causing the two switches which have completed the connection to return to normal.

References Cited in the file of this patent

UNITED STATES PATENTS

| | | |
|---|---|---|
| 2,426,196 | Gohorel | Aug. 26, 1947 |
| 2,490,036 | Gohorel | Dec. 6, 1949 |
| 2,567,190 | Deakin | Sept. 15, 1951 |